(12) United States Patent
Manolakos et al.

(10) Patent No.: US 12,386,008 B2
(45) Date of Patent: Aug. 12, 2025

(54) DORMANT SECONDARY CELL POSITIONING SIGNALING

(71) Applicant: QUALCOMM Incorporated, San Diego, CA (US)

(72) Inventors: Alexandros Manolakos, Escondido, CA (US); Weimin Duan, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 523 days.

(21) Appl. No.: 17/795,677

(22) PCT Filed: Feb. 8, 2021

(86) PCT No.: PCT/US2021/017002
§ 371 (c)(1),
(2) Date: Jul. 27, 2022

(87) PCT Pub. No.: WO2021/162960
PCT Pub. Date: Aug. 19, 2021

(65) Prior Publication Data
US 2023/0097008 A1 Mar. 30, 2023

(30) Foreign Application Priority Data

Feb. 12, 2020 (GR) .............................. 20200100071

(51) Int. Cl.
*G01S 5/00* (2006.01)
*H04L 5/00* (2006.01)
(Continued)

(52) U.S. Cl.
CPC .......... *G01S 5/0063* (2013.01); *H04L 5/0051* (2013.01); *H04W 24/10* (2013.01); *H04W 64/00* (2013.01)

(58) Field of Classification Search
CPC ... G01S 5/0063; G01S 5/0205; H04L 5/0051; H04W 24/10; H04W 64/00; H04W 76/15;
(Continued)

(56) References Cited

U.S. PATENT DOCUMENTS

| 11,570,643 B2 * | 1/2023 | Seo ........................ H04W 48/16 |
| 2015/0208269 A1 * | 7/2015 | Damnjanovic ....... H04L 5/0098 370/252 |

(Continued)

FOREIGN PATENT DOCUMENTS

| CN | 106304328 A | 1/2017 |
| CN | 110519853 A | 11/2019 |

(Continued)

OTHER PUBLICATIONS

International Search Report and Written Opinion—PCT/US2021/017002—ISA/EPO—May 28, 2021.

*Primary Examiner* — Kabir A Timory
(74) *Attorney, Agent, or Firm* — SUNSTEIN LLP

(57) ABSTRACT

A UE includes a processor configured to: receive, in a primary cell, a dormant indication of a dormant state of a secondary cell; and respond to receiving the dormant indication by implementing the dormant state of the secondary cell by inhibiting monitoring of a physical downlink control channel of the secondary cell; where the processor is configured to respond to a positioning signal including a first portion that is configured within a bandwidth of the secondary cell and that is received while the secondary cell is in the dormant state by: withholding processing of the positioning signal; or withholding processing of the first portion of the positioning signal and processing a second portion, if any, of the positioning signal that is configured outside the bandwidth of the secondary cell; or processing the positioning signal.

30 Claims, 9 Drawing Sheets

(51) Int. Cl.
*H04W 24/10* (2009.01)
*H04W 64/00* (2009.01)

(58) Field of Classification Search
CPC . H04W 76/27; H04W 76/28; H04W 52/0229;
H04W 4/029; H04W 4/025; Y02D 30/70
See application file for complete search history.

(56) References Cited

U.S. PATENT DOCUMENTS

| | | |
|---|---|---|
| 2015/0215929 A1 | 7/2015 | Damnjanovic et al. |
| 2018/0077729 A1 | 3/2018 | Lee et al. |
| 2019/0021052 A1* | 1/2019 | Kadiri .................. H04L 5/0098 |
| 2021/0250156 A1* | 8/2021 | Kim ..................... H04L 5/0098 |

FOREIGN PATENT DOCUMENTS

| | | |
|---|---|---|
| EP | 2747498 A1 | 6/2014 |
| EP | 3310102 A1 | 4/2018 |
| WO | 2014153698 A1 | 10/2014 |
| WO | 2015108636 A2 | 7/2015 |
| WO | 2017028511 A1 | 2/2017 |

\* cited by examiner

DORMANT SECONDARY CELL POSITIONING SIGNALING

CROSS-REFERENCE TO RELATED APPLICATIONS

This application is the National Stage of International Application No. PCT/US2021/017002, filed Feb. 8, 2021, entitled "DORMANT SECONDARY CELL POSITIONING SIGNALING," which claims the benefit of Greek patent application No. 20200100071, filed Feb. 12, 2020, entitled "DORMANT SECONDARY CELL POSITIONING SIGNALING," both of which are assigned to the assignee hereof, and the entire contents of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a user equipment (UE) includes: a transceiver configured to receive a positioning signal; a memory; and a processor, communicatively coupled to the transceiver and the memory, configured to: receive, via the transceiver in a primary cell, a dormant indication of a dormant state of a secondary cell; and respond to receiving the dormant indication by implementing the dormant state of the secondary cell by inhibiting monitoring of a physical downlink control channel of the secondary cell by the processor; where the processor is configured to operate in accordance with a first option, or configured to operate in accordance with a second option, or configured to operate in accordance with a third option, or any combination thereof; and where the processor is configured to respond to the positioning signal including a first portion that is configured within a bandwidth of the secondary cell and that is received while the secondary cell is in the dormant state by: withholding, in accordance with the first option, processing of the positioning signal; or withholding, in accordance with the second option, processing of the first portion of the positioning signal and processing a second portion, if any, of the positioning signal that is configured outside the bandwidth of the secondary cell; or processing, in accordance with the third option, the positioning signal.

Implementations of such a UE may include one or more of the following features. The processor is configured to operate in accordance with the first option and the third option and is further configured to select either the first option or the third option based on whether a measurement gap is scheduled. The processor is configured to select the first option based on an absence of a scheduled measurement gap and to select the third option based on a presence of the scheduled measurement gap.

Also or alternatively, implementations of such a UE may include one or more of the following features. The positioning signal includes one or more positioning reference signal (PRS) resources, or one or more PRS resource sets, or all PRS resources of one or more frequency layers, or another positioning reference signal that can be used for positioning measurement. The processor is configured to operate in accordance with at least two of the first option, the second option, and the third option, and is further configured to select which option in accordance with which to operate based on an instruction received via the transceiver. The processor is further configured to transmit a sounding reference signal (SRS) for positioning within the bandwidth of the secondary cell in response to the processor processing the positioning signal according to the second option or the third option. The processor is further configured to prevent transmission of an SRS for positioning within the bandwidth of the secondary cell absent the processor processing the positioning signal in accordance with the second option or the third option. The processor is further configured to respond to receiving a configuration indication by selecting a mode of the processor in which the processor is configured to transmit an SRS for positioning within the bandwidth of the secondary cell similarly to how the processor is configured to transmit other SRS, based on the configuration indication lacking one or more parameters needed to configure the processor to receive downlink positioning reference signals within the bandwidth of the secondary cell. The processor is further configured to determine whether to transmit an SRS for positioning within the bandwidth of the secondary cell, with the secondary cell being in the dormant state, based on a configuration indication received via the transceiver. The processor is further configured to send, via the transceiver, an indication to a network entity indicating at least one of: that a particular secondary cell is in the dormant state; or that the particular secondary cell may be dynamically configured to be in the dormant state; or that a configured positioning signal is within a bandwidth of the particular secondary cell and the particular secondary cell is in the dormant state; or that the configured positioning signal is within the bandwidth of the particular secondary cell and the particular secondary cell may be dynamically configured to be in the dormant state.

In an embodiment, a method of implementing a dormant state of a secondary cell includes: receiving a positioning signal in the secondary cell at a UE (user equipment); receiving, in a primary cell at the UE, a dormant indication of the dormant state of the secondary cell; responding to receiving the dormant indication by implementing the dormant state of the secondary cell by inhibiting monitoring of a physical downlink control channel of the secondary cell by the UE; and responding to the positioning signal including a first portion that is configured within a bandwidth of the secondary cell and that is received while the secondary cell is in the dormant state by: performing a first option including withholding processing of the positioning signal; or performing a second option including withholding processing of the first portion of the positioning signal and processing a second portion, if any, of the positioning signal that is configured outside the bandwidth of the secondary cell; or performing a third option including processing the positioning signal.

Implementations of such a method may include one or more of the following features. The method includes determining whether to perform the first option or the third option based on whether a measurement gap is scheduled. The method includes: determining to perform the first option based on an absence of a scheduled measurement gap; or determining to perform the third option based on a presence of the scheduled measurement gap.

Also or alternatively, implementations of such a method may include one or more of the following features. The positioning signal includes one or more PRS resources, or one or more PRS resource sets, or all PRS resources of one or more frequency layers, or another positioning reference signal that can be used for positioning measurement. Implementing the dormant state includes selecting to perform the first option, or the second option, or the third option based on an instruction received via a transceiver of the UE. The method includes transmitting an SRS for positioning within the bandwidth of the secondary cell based on processing of the positioning signal according to the second option or the third option. The method includes preventing transmission of an SRS for positioning within the bandwidth of the secondary cell absent processing of the positioning signal in accordance with the second option or the third option. The method further includes, in response to receiving a configuration indication, transmitting an SRS for positioning within the bandwidth of the secondary cell similarly to how a processor of the UE is configured to transmit other SRS based on the configuration indication lacking one or more parameters needed to configure the processor to receive downlink positioning reference signals within the bandwidth of the secondary cell. The method further includes determining whether to transmit an SRS for positioning within the bandwidth of the secondary cell, with the secondary cell being in the dormant state, based on a configuration indication received via a transceiver of the UE. The method further includes sending an indication, from at least one of the UE or a serving base station, to a network entity indicating at least one of: that a particular secondary cell is in the dormant state; or that the particular secondary cell may be dynamically configured to be in the dormant state; or that a configured positioning signal is within a bandwidth of the particular secondary cell and the particular secondary cell is in the dormant state; or that the configured positioning signal is within the bandwidth of the particular secondary cell and the particular secondary cell may be dynamically configured to be in the dormant state.

In an embodiment, a UE includes: means for receiving a positioning signal in a secondary cell; means for receiving, in a primary cell, a dormant indication of a dormant state of the secondary cell; means for responding to receiving the dormant indication by implementing the dormant state of the secondary cell by inhibiting monitoring of a physical downlink control channel of the secondary cell by the UE; means for operating the UE including means for performing a first option, or means for performing a second option, or means for performing a third option, or any combination thereof; and means for responding to the positioning signal including a first portion that is configured within a bandwidth of the secondary cell and that is received while the secondary cell is in the dormant state by having the means for operating the UE: perform the first option by withholding processing of the positioning signal; or perform the second option by withholding processing of the first portion of the positioning signal and processing a second portion, if any, of the positioning signal that is configured outside the bandwidth of the secondary cell; or perform the third option by processing the positioning signal.

Implementations of such a UE may include one or more of the following features. The means for operating the UE include the means for performing the first option and the means for performing the third option, and the UE further includes means for determining whether to perform the first option or the third option based on whether a measurement gap is scheduled. The means for determining whether to perform the first option or the third option include means for determining to perform the first option based on an absence of a scheduled measurement gap and means for determining to perform the third option based on a presence of the scheduled measurement gap.

Also or alternatively, implementations of such a UE may include one or more of the following features. The positioning signal includes one or more PRS resources, or one or more PRS resource sets, or all PRS resources of one or more frequency layers, or another positioning reference signal that can be used for positioning measurement. The UE includes at least two of the means for performing the first option, the means for performing the second option, and the means for performing the third option, and the means for responding to receiving the dormant indication include means for selecting which option to perform based on an instruction received via a transceiver of the UE. The UE includes means for transmitting an SRS for positioning within the bandwidth of the secondary cell based on the means for operating the UE processing the positioning signal according to the second option or the third option. The UE includes means for preventing transmission of an SRS for positioning within the bandwidth of the secondary cell absent processing by the means for operating the UE of the positioning signal in accordance with the second option or the third option. The UE includes means, responsive to receiving a configuration indication, for transmitting an SRS for positioning within the bandwidth of the secondary cell similarly to how a processor of the UE is configured to transmit other SRS based on the configuration indication lacking one or more parameters needed to configure the processor to receive downlink positioning reference signals within the bandwidth of the secondary cell. The UE includes means for determining whether to transmit an SRS for positioning within the bandwidth of the secondary cell, with the secondary cell being in the dormant state, based on a configuration indication received via a transceiver of the UE. The UE includes means for sending an indication from the UE to a network entity indicating at least one of: that a particular secondary cell is in the dormant state; or that the particular secondary cell may be dynamically configured to be in the dormant state; or that a configured positioning signal is within a bandwidth of the particular secondary cell and the particular secondary cell is in the dormant state; or that the configured positioning signal is within the bandwidth of the particular secondary cell and the particular secondary cell may be dynamically configured to be in the dormant state.

In an embodiment, a non-transitory, processor-readable storage medium includes processor-readable instructions configured to cause a processor of a user equipment (UE) to: respond to receiving, in a primary cell, a dormant indication of a dormant state of a secondary cell by implementing the dormant state of the secondary cell by inhibiting monitoring of a physical downlink control channel of the secondary cell by the processor; perform a first option, or perform a second option, or perform a third option, or any combination thereof; and respond to receiving, in the secondary cell, a positioning signal including a first portion that is configured within a bandwidth of the secondary cell and that is received while the secondary cell is in the dormant state by: performing the first option by withholding processing by the processor of the positioning signal; or performing the second option by withholding processing of the first portion of the positioning signal and processing a second portion, if any, of the positioning signal that is configured outside the bandwidth of the secondary cell; or performing the third option by processing the positioning signal.

Implementations of such a storage medium may include one or more of the following features. The processor-readable instructions include processor-readable instructions to cause the processor to perform the first option and to perform the third option, and the storage medium further includes processor-readable instructions to cause the processor to determine whether to perform the first option or the third option based on whether a measurement gap is scheduled. The processor-readable instructions to cause the processor to determine whether to perform the first option or the third option include processor-readable instructions to cause the processor to determine to perform the first option based on an absence of a scheduled measurement gap and to cause the processor to perform the third option based on a presence of the scheduled measurement gap.

Also or alternatively, implementations of such a storage medium may include one or more of the following features. The positioning signal includes one or more PRS resources, or one or more PRS resource sets, or all PRS resources of one or more frequency layers, or another positioning reference signal that can be used for positioning measurement. The processor-readable instructions include processor-readable instructions to cause the processor to perform at least two of the first option, the second option, and the third option, and the storage medium further includes processor-readable instructions to cause the processor to select which option to perform based on an instruction received via a transceiver of the UE. The storage medium includes processor-readable instructions to cause the processor to transmit an SRS for positioning within the bandwidth of the secondary cell based on the processor-readable instructions causing the processor to process the positioning signal according to the second option or the third option. The storage medium includes processor-readable instructions to cause the processor to prevent transmission of an SRS for positioning within the bandwidth the secondary cell absent processing by the processor of the positioning signal in accordance with the second option or the third option. The storage medium includes processor-readable instructions to cause the processor to respond to receiving a configuration indication by transmitting an SRS for positioning within the bandwidth of the secondary cell similarly to how the processor transmits other SRS based on the configuration indication lacking one or more parameters needed to configure the processor to receive downlink positioning reference signals in the secondary cell. The storage medium includes processor-readable instructions to cause the processor to determine whether to transmit an SRS for positioning within the bandwidth of the secondary cell, with the secondary cell being in the dormant state, based on a configuration indication received via a transceiver of the UE. The storage medium includes processor-readable instructions to cause the processor to send, via a transceiver of the UE, an indication to a network entity indicating at least one of: that a particular secondary cell is in the dormant state; or that the particular secondary cell may be dynamically configured to be in the dormant state; or that a configured positioning signal is within a bandwidth of the particular secondary cell and the particular secondary cell is in the dormant state; or that the configured positioning signal is within the bandwidth of the particular secondary cell and the particular secondary cell may be dynamically configured to be in the dormant state.

In an embodiment, a UE includes: a transceiver configured to receive a PRS; a memory; and a processor, communicatively coupled to the transceiver and the memory, configured to: implement a dormant state for a secondary cell by inhibiting monitoring of a physical downlink control channel of the secondary cell by the processor; and transmit a Sounding Reference Signal (SRS) for positioning via the transceiver in the secondary cell in response to the processor processing the PRS received in the secondary cell while the secondary cell is in the dormant state.

Implementations of such a UE may include one or more of the following features. The processor is further configured to withhold transmitting the SRS for positioning absent the processor processing the PRS received in the secondary cell while the secondary cell is in the dormant state. The processor is configured to transmit the SRS for positioning in the secondary cell similarly to how the processor is configured to transmit other SRS based on absence of the processor receiving a PRS configuration via the transceiver. The processor is further configured to determine whether to transmit the SRS for positioning in the secondary cell based on an SRS transmission indication received via the transceiver from a network entity.

In an embodiment, a method of transmitting a Sounding Reference Signal (SRS) for positioning from a UE includes: implementing a dormant state for a secondary cell by inhibiting monitoring of a physical downlink control channel of the secondary cell by the UE; and transmitting the SRS for positioning from the UE in the secondary cell in response to the UE processing a PRS received in the secondary cell while the secondary cell is in the dormant state.

Implementations of such a method may include one or more of the following features. The method includes withholding transmitting the SRS for positioning absent the UE processing the PRS received in the secondary cell while the secondary cell is in the dormant state. Transmitting the SRS for positioning includes transmitting, absent the UE receiving a PRS configuration, the SRS for positioning in the secondary cell similarly to how other SRS are transmitted. Transmitting the SRS for positioning includes transmitting the SRS for positioning based on an SRS transmission indication received by the UE from a network entity.

In an embodiment, a UE includes: means for receiving a PRS; means for implementing a dormant state for a secondary cell by inhibiting monitoring of a physical downlink control channel of the secondary cell by the UE; means for processing the PRS; and means for transmitting the SRS for positioning from the UE in the secondary cell in response to the means for processing the PRS processing the PRS received in the secondary cell while the secondary cell is in the dormant state.

Implementations of such a UE may include one or more of the following features. The means for transmitting the SRS for positioning include means for withholding transmission of the SRS for positioning absent the means for processing the PRS processing the PRS received in the secondary cell while the secondary cell is in the dormant state. The means for receiving the PRS include means for receiving a PRS configuration from a network entity, and the means for transmitting the SRS for positioning include means, responsive to absence of the means for processing the PRS receiving the PRS configuration from the means for receiving the PRS, for transmitting the SRS for positioning in the secondary cell similarly to how the means for transmitting the SRS for positioning transmit other SRS. The means for receiving the PRS include means for receiving an SRS transmission indication from a network entity, and the means for transmitting the SRS for positioning include means for determining whether to transmit the SRS for positioning based on the SRS transmission indication.

In an embodiment, a non-transitory, processor-readable storage medium includes processor-readable instructions to cause a processor of a UE to: receive a PRS; implement a dormant state for a secondary cell by inhibiting monitoring of a physical downlink control channel of the secondary cell by the processor; and transmit the SRS for positioning from the UE in the secondary cell in response to the processor-readable instructions causing the processor to process the PRS received in the secondary cell while the secondary cell is in the dormant state.

Implementations of such a storage medium may include one or more of the following features. The storage medium includes processor-readable instructions to cause the processor to withhold transmitting the SRS for positioning absent the processor processing the PRS received in the secondary cell while the secondary cell is in the dormant state. The processor-readable instructions to cause the processor to transmit the SRS for positioning include processor-readable instructions to cause the processor to transmit, absent the UE receiving a PRS configuration from a network entity, the SRS for positioning within a bandwidth of the secondary cell similarly to how processor-readable instructions of the storage medium cause the processor to transmit other SRS. The storage medium includes processor-readable instructions to cause the processor to determine whether to transmit the SRS for positioning based on an SRS transmission indication received by the UE from a network entity.

DETAILED DESCRIPTION

Techniques are discussed herein for processing and transmitting positioning signals for secondary cells in a dormant state. A user equipment may implement a dormant state for a secondary cell, determine whether the user equipment is configured to receive downlink positioning signals, implement a positioning signal operating mode (possibly including determining which positioning signal operating mode to implement) to control whether received downlink positioning signals are processed, and to transmit positioning signals (e.g., uplink positioning signals) if the user equipment is expected to process received downlink positioning signals. Other configurations, however, may be used.

Items and/or techniques described herein may provide one or more of the following capabilities, as well as other capabilities not mentioned. Power may be saved measuring and/or processing positioning signals by implementing one or more operating modes for a dormant secondary cell. Processing of at least portions of downlink positioning signals may be prevented where the downlink positioning signals at least partially overlap with a bandwidth of the dormant secondary cell, which may save power and prolong battery life. Other capabilities may be provided and not every implementation according to the disclosure must provide any, let alone all, of the capabilities discussed.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

Figure 1:
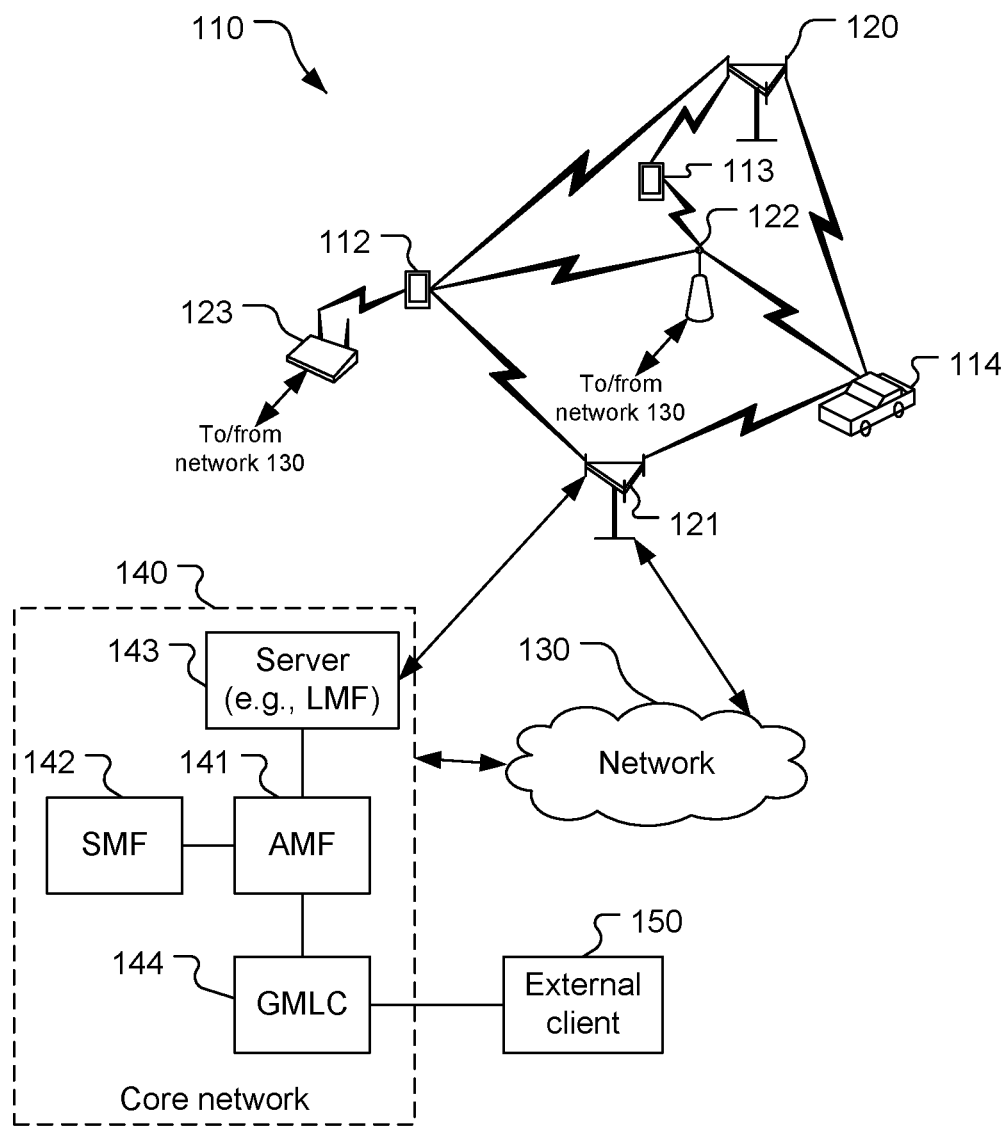
FIG. 1 is a simplified diagram of an example wireless communications system.

Referring to FIG. 1, an example wireless communications system 110 includes a user equipment (UE) 112, a UE 113, a UE 114, base transceiver stations (BTSs) 120, 121, 122, 123, a network 130, a core network 140, and an external client 150. The core network 140 (e.g., a 5G core network (5GC)) may include back-end devices including, among other things, an Access and Mobility Management Function (AMF) 141, a Session Management Function (SMF) 142, a server 143, and a Gateway Mobile Location Center (GMLC) 144. The AMF 141, the SMF 142, the server 143, and the GMLC 144 are communicatively coupled to each other. The server 143 may be, for example, a Location Management Function (LMF) that supports positioning of the UEs 112-114 (e.g., using techniques such as Assisted GNSS (A-GNSS), OTDOA (Observed Time Difference of Arrival, e.g., Downlink (DL) OTDOA and/or Uplink (UL) OTDOA), Round Trip Time (RTT), Multi-Cell RTT, RTK (Real Time Kinematic), PPP (Precise Point Positioning), DGNSS (Differential GNSS), E-CID (Enhanced Cell ID), AoA (Angle of Arrival), AoD (Angle of Departure), etc.).

An LMF may also be referred to as a Location Manager (LM), a Location Function (LF), a commercial LMF (CLMF), or a value-added LMF (VLMF). The server 143 (e.g., an LMF) and/or one or more other devices of the system 110 (e.g., one or more of the UEs 112-114) may be configured to determine locations of the UEs 112-114. The server 143 may communicate directly with the BTS 121 (e.g., a gNB) and/or one or more other BTSs, and may be integrated with the BTS 121 and/or one or more other BTSs. The SMF 142 may serve as an initial contact point of a Service Control Function (SCF) (not shown) to create, control, and delete media sessions. The server 143 (e.g., an LMF) may be co-located or integrated with a gNB or TRP (Transmission/Reception Point), or may be disposed remote from the gNB and/or TRP and configured to communicate directly or indirectly with the gNB and/or the TRP.

The AMF 141 may serve as a control node that processes signaling between the UEs 112-114 and the core network 140, and may provide QoS (Quality of Service) flow and session management. The AMF 141 may support mobility of the UEs 112-114 including cell change and handover and may participate in supporting signaling connection to the UEs 112-114.

The system 110 is capable of wireless communication in that components of the system 110 can communicate with one another (at least some times using wireless connections) directly or indirectly, e.g., via the BTSs 120-123 and/or the network 130 (and/or one or more other devices not shown, such as one or more other base transceiver stations). For indirect communications, the communications may be altered during transmission from one entity to another, e.g., to alter header information of data packets, to change format, etc. The UEs 112-114 shown are a smartphone, a tablet computer, and a vehicle-based device, but these are examples only as the UEs 112-114 are not required to be any of these configurations, and other configurations of UEs may be used. The UEs 112, 113 shown are mobile wireless communication devices (although they may communicate wirelessly and via wired connections) including mobile phones (including smartphones) and a tablet computer. The UE 114 shown is a vehicle-based mobile wireless communication device (although the UE 114 may communicate wirelessly and via wired connections). Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 110 and may communicate with each other and/or with the UEs 112-114, the BTSs 120-123, the network 130, the core network 140, and/or the external client 150. For example, such other devices may include internet of thing (IoT) devices, medical devices, home entertainment and/or automation devices, etc. The core network 140 may communicate with the external client 150 (e.g., a computer system), e.g., to allow the external client 150 to request and/or receive location information regarding the UEs 112-114 (e.g., via the GMLC 144).

The UEs 112-114 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 110 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc.

The BTSs 120-123 may wirelessly communicate with the UEs 112-114 in the system 110 via one or more antennas. A BTS may also be referred to as a base station, an access point, a gNode B (gNB), an access node (AN), a Node B, an evolved Node B (eNB), etc. For example, each of the BTSs 120, 121 may be a gNB or a transmission point gNB, the BTS 122 may be a macro cell (e.g., a high-power cellular base station) and/or a small cell (e.g., a low-power cellular base station), and the BTS 123 may be an access point (e.g., a short-range base station configured to communicate with short-range technology such as WiFi, WiFi-Direct (WiFi-D), Bluetooth®, Bluetooth®-low energy (BLE), Zigbee, etc. One or more of the BTSs 120-123 may be configured to communicate with the UEs 112-114 via multiple carriers. Each of the BTSs 120, 121 may provide communication coverage for a respective geographic region, e.g. a cell. Each cell may be partitioned into multiple sectors as a function of the base station antennas.

The BTSs 120-123 each comprise one or more Transmission/Reception Points (TRPs). For example, each sector within a cell of a BTS may comprise a TRP, although multiple TRPs may share one or more components (e.g., share a processor but have separate antennas). The system 110 may include only macro TRPs or the system 110 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

The UEs 112-114 may be referred to as terminals, access terminals (ATs), mobile stations, mobile devices, subscriber units, etc. The UEs 112-114 may include various devices as listed above and/or other devices. The UEs 112-114 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of the UEs 112-114 utilizing D2D communications may be within a geographic coverage area of a TRP such as one or more of the BTSs 120-123. Other UEs in such a group may be outside such geographic coverage areas, or be otherwise unable to receive transmissions from a base station. Groups of the UEs 112-114 communicating via D2D communications may utilize a one-to-many (1:M) system in which each UE may transmit to other UEs in the group. A TRP of the BTSs 120-123 may facilitate scheduling of resources for D2D communications. In other cases, D2D communications may be carried out between UEs without the involvement of a TRP.

Figure 2:
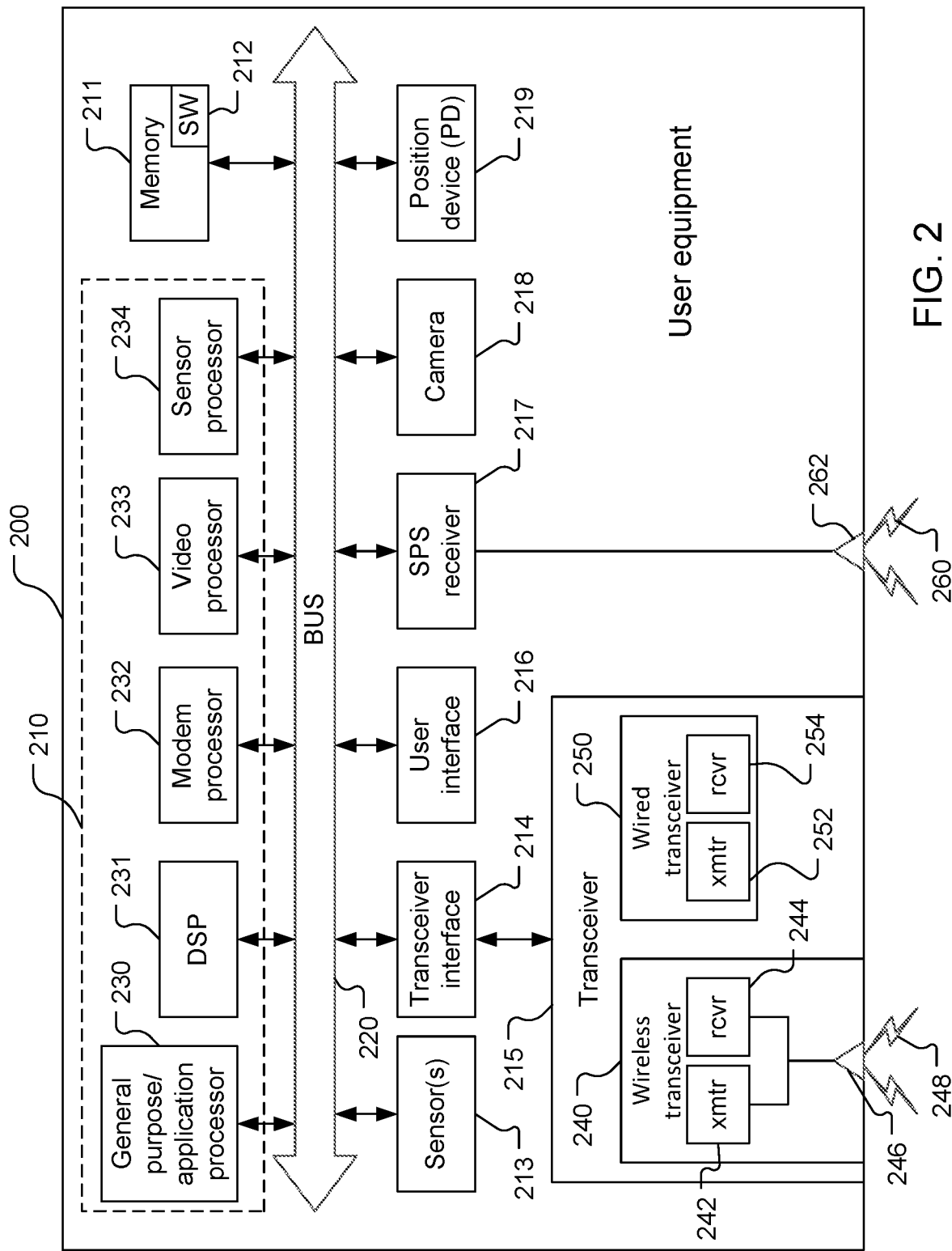
FIG. 2 is a block diagram of components of an example user equipment shown in FIG. 1.

Referring also to FIG. 2, a UE 200 is an example of one of the UEs 112-114 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the server 143 regarding the mobility of the UE 200. For example, based on the information obtained/measured by the sensor(s) 213, the UE 200 may notify/report to the server 143 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., with the network 130. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer only to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 262, and/or another component of the UE 200, and may be provided by hardware, software, firmware, or various combinations thereof.

Figure 3:
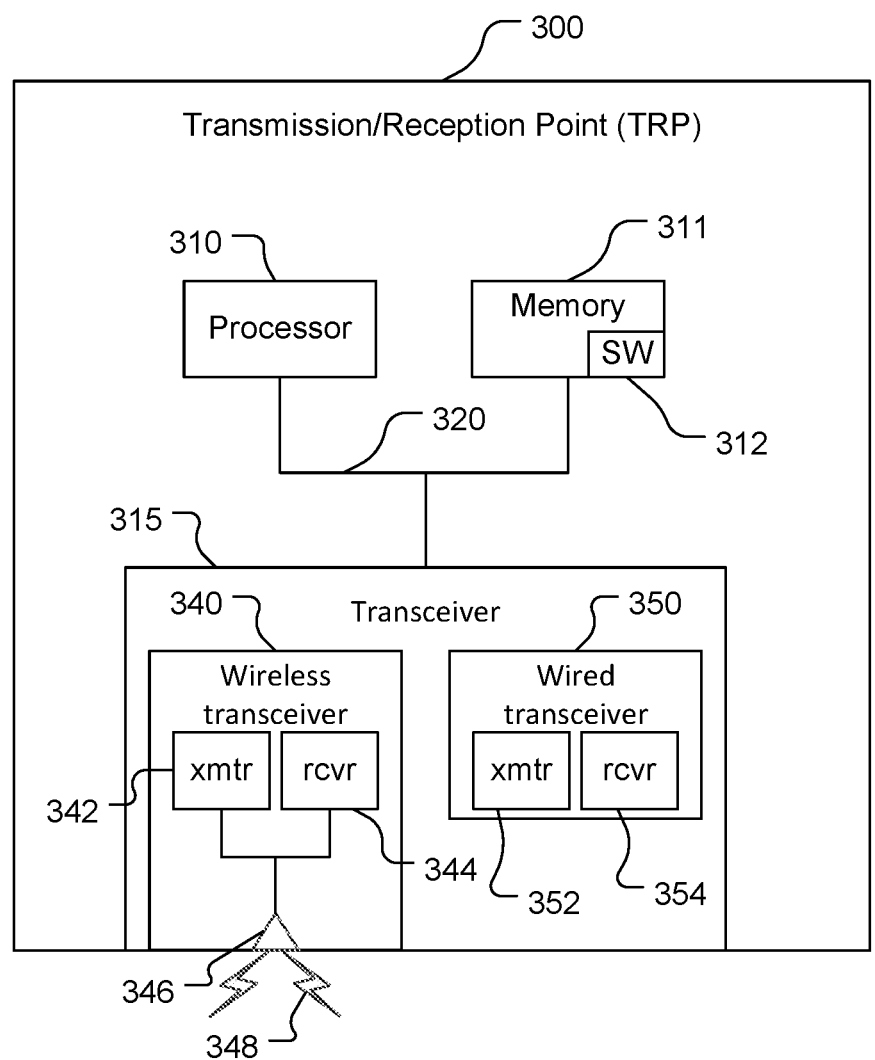
FIG. 3 is a block diagram of components of an example transmission/reception point shown in FIG. 1.

Referring also to FIG. 3, an example of a TRP 300 of the BTSs 120-123 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BTSs 120-123) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 130 to send communications to, and receive communications from, the server 143 and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the server 143 and/or the UE 200 (i.e., the server 143 and/or the UE 200 may be configured to perform one or more of these functions).

Figure 4:
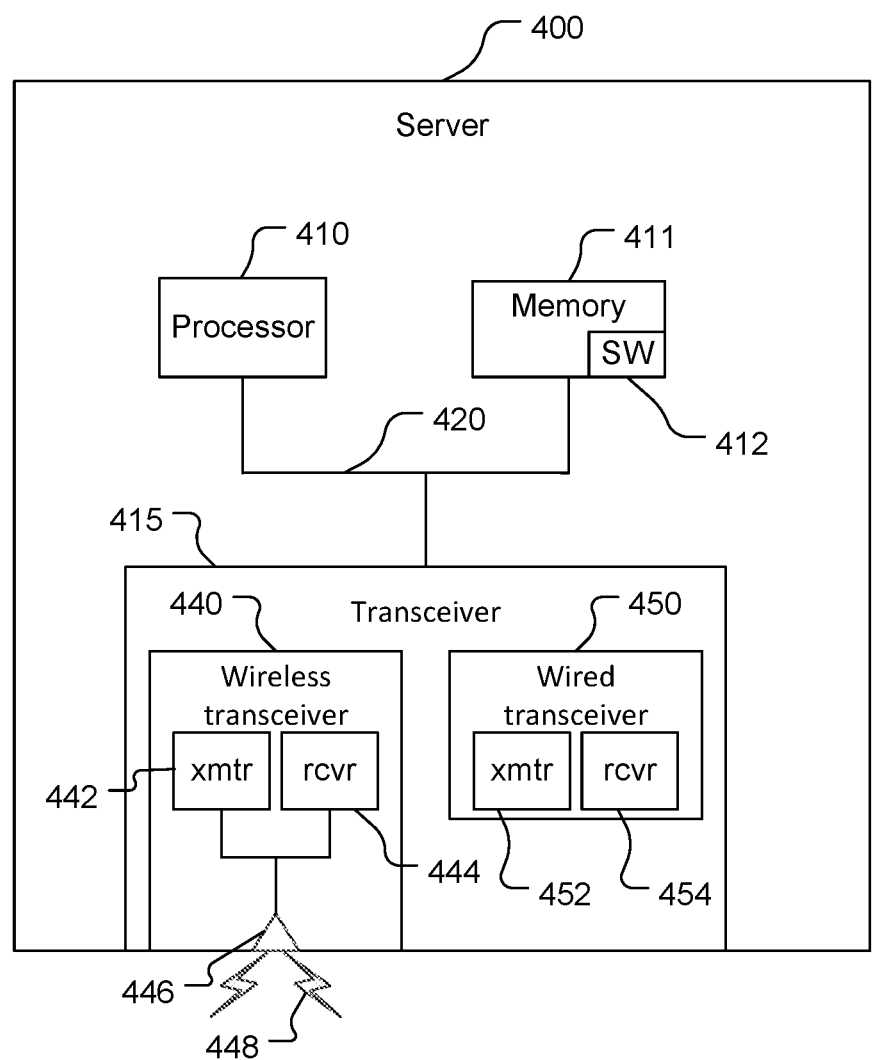
FIG. 4 is a block diagram of components of an example server shown in FIG. 1.

Referring also to FIG. 4, a server 400, which is an example of the server 143, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 130 to send communications to, and receive communications from, the TRP 300 and/or one or more other entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or wardriving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS) and uplink PRS (UL PRS) (which may be called SRS (Sounding Reference Signal) for positioning). PRS may comprise PRS resources or PRS resource sets of a frequency layer. A DL PRS positioning frequency layer (or simply a frequency layer) is a collection of DL PRS resource sets, from one or more TRPs, that have common parameters configured by higher-layer parameters DL-PRS-Positioning-FrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element).

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Discontinuous Reception

Figure 5:
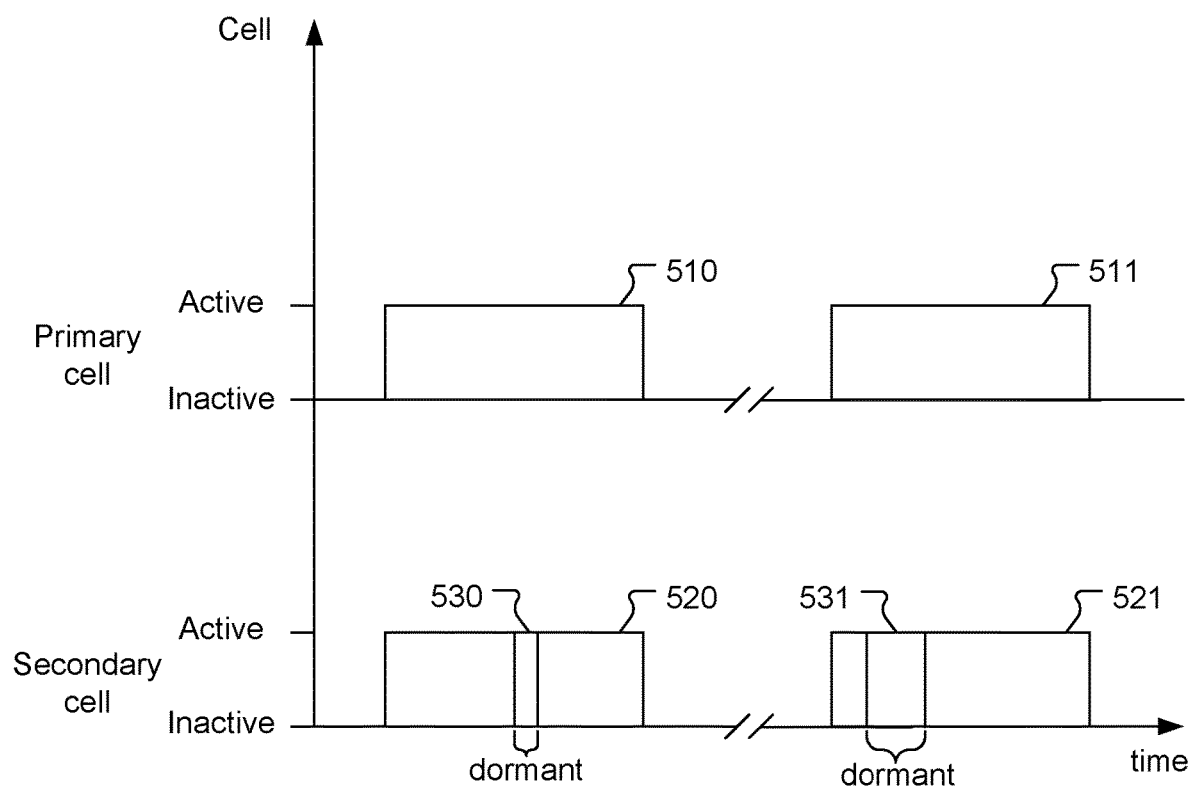
FIG. 5 is a timing diagram of discontinuous reception cycles.

Referring also to FIG. 5, discontinuous reception (DRX) is a mechanism in which a UE, e.g., the UE 200, operates intermittently in a sleep mode and an active mode. The UE 200 may enter the sleep mode from the active mode and stay in the sleep mode for a predetermined amount of time, although the time in the sleep mode may be altered, e.g., before entering the sleep mode or while in the sleep mode. The UE 200 may enter the sleep mode in response to a MAC-CE (Media Access Control-Control Element) or in response to expiration of a timer (e.g., a secondary cell deactivation timer, sCellDeactivationTimer). The sleep mode time may be altered dynamically or in a predetermined way (e.g., according to a schedule of different sleep times).

The UE 200 may enter the active mode by waking up from the sleep mode, e.g., in response to a MAC-CE (Media Access Control-Control Element). As shown in FIG. 5, for a primary cell (e.g., of the TRP 300), the UE 200 has active times 510, 511 and for a secondary cell (e.g., of the TRP 300), the UE 200 has active times 520, 521. In "normal," non-DRX operation, the UE 200 is in the active mode at all times and monitors a PDCCH (Physical Downlink Control CHannel) for every subframe or slot or monitoring instance as the UE 200 is unaware of when the network will transmit data for the UE 200. This non-DRX operation may consume more power than is desired and, for example, cause the UE 200 to require charging more than desired or lack power to run one or more desired functions.

During the DRX active time, the UE 200 typically monitors the PDCCH. The active time includes times that: the ON duration timer is running; the DRX inactivity timer is running; the DRX retransmission timer is running; a MAC (Media Access Control) contention resolution timer is running; a scheduling request has been sent on PUCCH (Physical Uplink Control CHannel) and is pending; an uplink grant for a pending HARQ (Hybrid Automatic Repeat reQuest) retransmission may occur and there is data in a corresponding HARQ buffer; a PDCCH (communication) indicates a new transmission addressed to a C-RNTI (Cell-Radio Network Temporary Identity) of the UE 200 has not been received after successful reception of an RAR (Random Access Response) for the preamble not selected by the UE 200; and in a non-contention based RA (Routing Area), until a PDCCH indicating a new transmission to the C-RNTI of the UE 200 is received.

Figure 6:
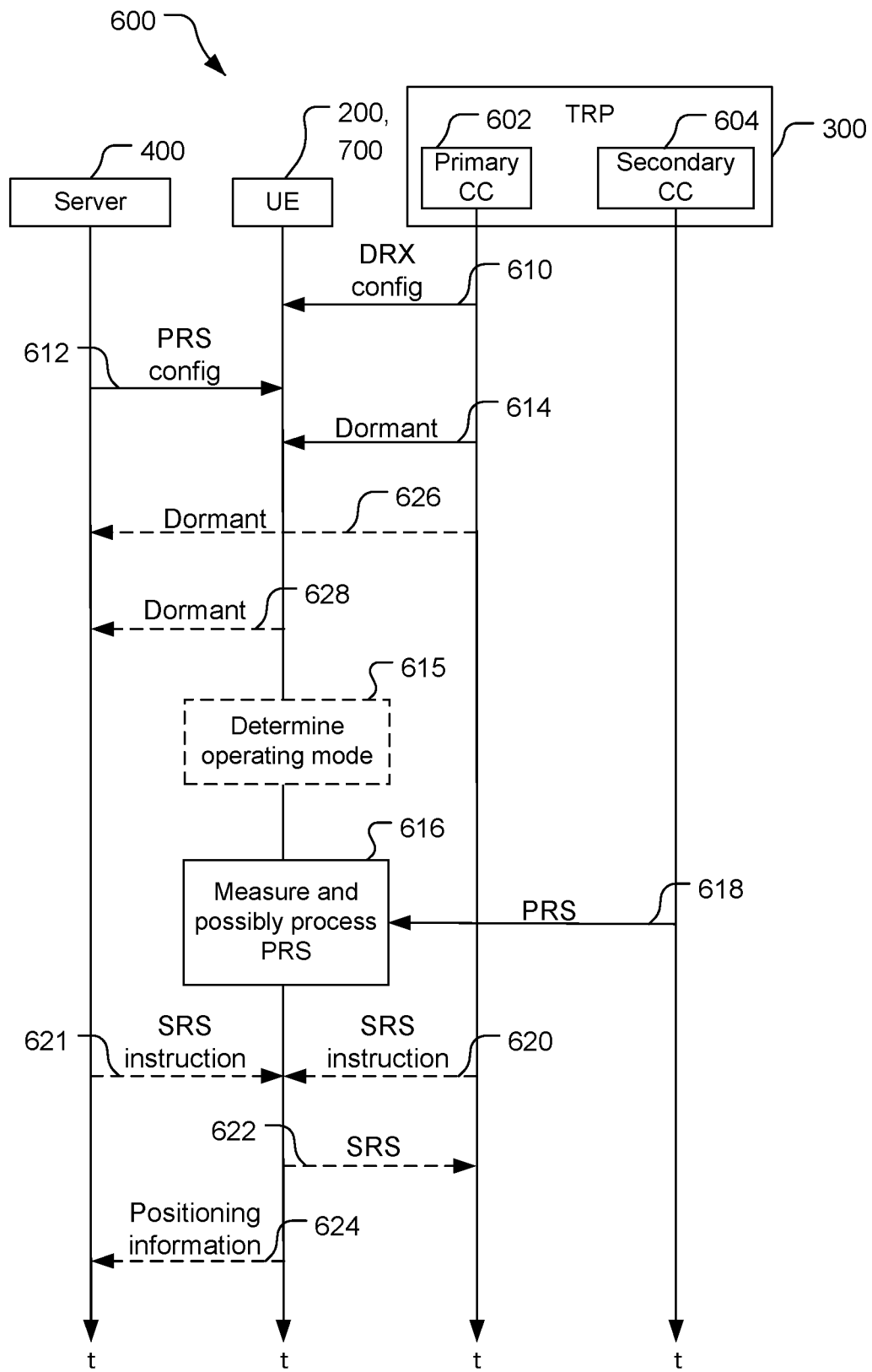
FIG. 6 is a diagram of a process and signal flow of interaction between, and operation of, elements of the system shown in FIG. 1.

Referring also to FIG. 6, a signal and processing flow 600 shows that the UE 200 (or a UE 700, discussed further with respect to FIG. 7) typically receives a DRX configuration 610 from the TRP 300. The order of communication and processing of the flow 600 is an example, and may be changed (e.g., the indications 626, 628 may be sent at different times than shown, the DRX configuration 610 may be sent after the PRS configuration 612, etc.). The TRP 300 may be referred to as a serving TRP and may provide carrier aggregation (CA) communication with the UE 200 using multiple component carriers (CCs), e.g., with a primary component carrier 602 (and/or its associated communication link) referred to as a primary cell and a secondary component carrier 604 (and/or its associated communication link) referred to as a secondary cell. The primary cell operates on a primary frequency in which the UE performs initial connection establishment or initiates connection re-establishment, or is the cell indicated as the primary cell in a handover. The secondary cell operates on a secondary frequency (different than the primary frequency), may be configured once an RRC (Radio Resource Control) connection is established with the UE, and may be used to provide radio resources in addition to the primary cell. The primary cell and the secondary cell each have an associated bandwidth that includes the frequency of the respective component carrier. The DRX configuration 610 may include parameters of a DRX cycle, a DRX ON duration timer, a DRX inactivity timer, a DRX retransmission timer, a short DRX cycle, and a DRC short cycle timer. The DRX cycle parameter indicates a duration of one ON time (active time, i.e., time in active mode) and one OFF time (sleep time, i.e., time in sleep mode). The DRX cycle may not be specified in an RRC signal, but rather calculated from the subframe or slot time and a long DRX cycle start offset. The DRX ON duration timer indicates the duration of the ON time within one DRX cycle. The DRX inactivity timer indicates how long the UE should remain ON after reception of a PDCCH communication. This may extend the UE ON period into a time when the UE would be OFF had the UE not received the PDCCH communication. The DRX retransmission timer indicates a maximum number of consecutive PDCCH subframes or slots or monitoring instances during which the UE should remain active (ON) to wait for an incoming retransmission after a first available retransmission time. The DRX short cycle is a DRX cycle that can be implemented within the OFF time of a long DRX cycle. The DRX short cycle timer indicates a consecutive number of subframes or slots that follow the short DRX cycle after the DRX inactivity timer has expired.

Discontinuous reception may affect reference signal measurement. The UE 200 may receive a PRS configuration 612 to configure the UE 200 to receive reference signals. For example, the server 400 may send the PRS configuration 612 to the UE 200. The processor 210, in combination with the transceiver 215 (e.g., the wireless receiver 244) and possibly in combination with the memory 211 (e.g., the software 212), may comprise means for receiving the PRS configuration 612. While the description herein refers to PRS, this term is not limited to any particular form of positioning signal, and thus the PRS configuration 612 provides a positioning signal configuration. The PRS configuration 612 may be sent directly from the server 400 to the UE 200 or via one or more intermediaries, such as the TRP 300. The PRS configuration 612 may include, for example, scheduled timing of periodic PRS, periodicity, slot offset, bandwidth offset, number of ports, repetition factor, number of PRS symbols within a slot, and/or whether to expect aperiodic PRS and/or aperiodic report requests. For NR, if the UE 200 is configured with DRX, then the UE 200 may not measure CSI-RS (Channel State Information-Reference Signal) resources other than during the active time based on CSI-RS-Resource-Mobility. Further, if the DRX cycle is longer than 80 ms, then the UE may not expect CSI-RS resources are available other than during the active time based on CSI-RS-Resource-Mobility. Otherwise, the UE 200 may assume that CSI-RS are available for measurement based on CSI-RS-Resource-Mobility. For NR, regarding CSI acquisition and feedback, with DRX configured, the UE 200 may report a CSI report only if the UE 200 receives at least one CSI-RS transmission occasion for channel measurement and CSI-RS and/or CSI-IM (CSI-Interference Measurement) occasion in the active time no later than the CSI reference resource and may drop the report otherwise. The most recent CSI measurement occasion occurs in the DRX active time for CSI to be reported. For LTE, the UE 200 is expected to measure outside the active DRX time, e.g., to fulfill requirements of an LPP (LTE Positioning Protocol) request.

Dormant State

As shown in FIG. 5, a dormant state (i.e., a sub-state) may be implemented within an active state of a secondary cell. As shown, the UE 200 implements a dormant state during a dormant time 530 within the active time 520 and during a dormant time 531 within the active time 521. Different dormant times may be different lengths of time (as are the dormant times 530, 531), or could be the same time duration. Although not shown, a single active time may include multiple, separate dormant times. For the dormant state of the secondary cell, the UE 200 inhibits (e.g., prevents) monitoring of the PDCCH of the secondary cell, at least for a particular BWP, but may continue to perform CSI measurements, AGC (Automatic Gain Control), and beam management (if configured to do so). The UE 200 may switch between a dormant BWP and a non-dormant BWP that are associated with dormant and non-dormant behaviors, respectively. Implementing the dormant state may help save power (e.g., prolong battery life) by avoiding power consumption due to active DL and UL data transmissions.

The UE 200 may implement the dormant state in response to expiration of an inactivity timer, e.g., a BWP (BandWidth Part) inactivity timer or in response to a dormant instruction 614 in the primary cell. The dormant instruction 614 may be part of the DCI (Downlink Control Information) from the TRP 300 using the primary component carrier 602 using the PDCCH during an active time, or part of a wake-up signal (WUS) when outside of the active time. The dormant instruction 614 may indicate which secondary cells are to be dormant, and may or may not schedule data for the primary cell. For example, the dormant instruction 614 may comprise a 0 bit if a higher-layer parameter Scell-groups-for-dormancy-within-active-time is not configured and otherwise may comprise a 1-bit, 2-bit, 3-bit, 4-bit, or 5-bit bitmap determined according to the parameter Scell-groups-for-dormancy-within-active-time. Each bit of the bitmap corresponds to an Scell (secondary cell) group configured by the parameter Scell-groups-for-dormancy-within-active-time, with the most-significant bit (MSB) to the least-significant bit (LSB) of the bitmap corresponding to the earliest to the most-recently configured secondary cell group. The dormant instruction 614 may only be present on the PDCCH on the primary cell within a DRX active time when the UE 200 is configured with at least two DL BWPs for a secondary cell.

The TRP 300 and/or the UE 200 may inform the server (e.g., LMF) that a secondary cell is dormant or may dynamically become dormant. For example, the TRP 300 may send a dormant indication 626 in the primary cell (using the primary component carrier 602) indicating that the secondary cell is dormant, and/or that the secondary cell may be dynamically controlled to be dormant or not, and/or that a specific PRS is configured in a dormant secondary cell or a secondary cell that could be dynamically changed to being dormant. As another example, the UE 200 may send a dormant indication 628 indicating that the secondary cell is dormant or that the secondary cell may be dynamically controlled to be dormant or not. The server 400 may use the dormant indication(s) 626, 628 to affect operation of the server 400. For example, based on the indication(s) 626, 628 the server 400 may not wait for PRS measurement information or other position information based on PRS for the indicated secondary cell. As another example, the server 400 may discount or ignore position information provided by a UE with a secondary cell in the dormant state. As another example, the server 400 may respond to the dormant indication(s) by reconfiguring a PRS to a different carrier.

UE PRS Operating Modes

The UE 200 may be configured to operate in accordance with one or more of multiple PRS operating modes for processing positioning signals. The modes of the UE 200 may cause the UE 200 to process or not process positioning signals (e.g., PRS) received in a secondary cell while the secondary cell is in a dormant state (i.e., while the UE 200 implements the dormant state for the secondary cell). The modes may apply to a variety of positioning signals, here called PRS. PRS may comprise PRS resources, PRS resource sets, or PRS resources of a frequency layer. A DL PRS positioning frequency layer (or simply a frequency layer) is a collection of DL PRS resource sets that have common parameters configured by the parameter DL-PRS-PositioningFrequencyLayer. Each frequency layer has a DL PRS subcarrier spacing for the DL PRS resource sets and the DL PRS resources in the frequency layer. Each frequency layer has a DL PRS cyclic prefix for the DL PRS resource sets and the DL PRS resources in the frequency layer. Also, a DL PRS Point A parameter defines a frequency of a reference resource block, with DL PRS resources belonging to the same DL PRS resource set having the same Point A and all DL PRS resource sets belonging to the same frequency layer having the same Point A.

Figure 7:
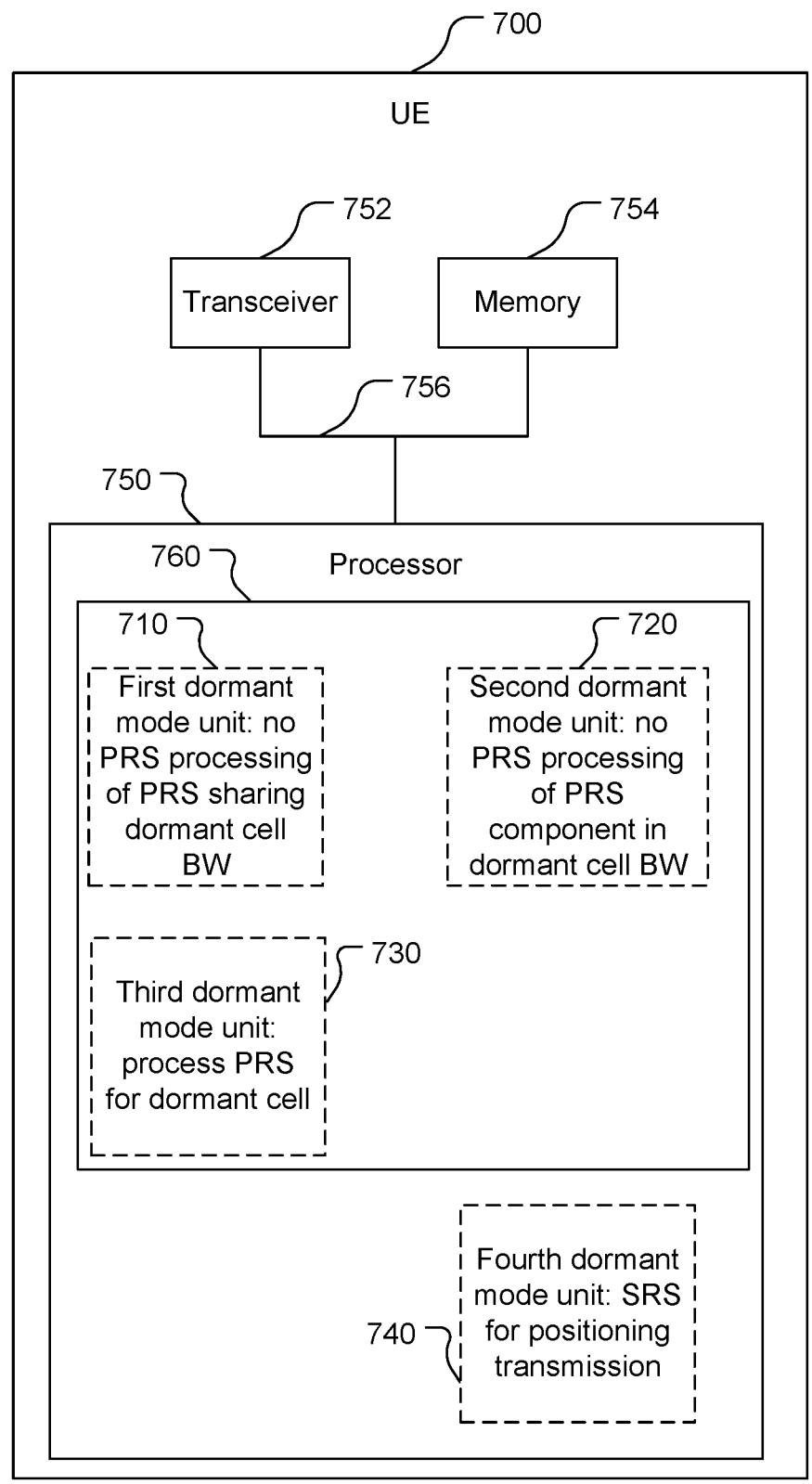
FIG. 7 is a block diagram of components of an embodiment of a user equipment showing functional blocks of a processor of the user equipment.

Referring also to FIG. 7 that shows a UE 700 that includes a processor 750, a transceiver 752, a memory 754, and a bus 756 that communicatively couples the processor 750, the transceiver 752, and the memory 754 to each other. The UE 700 may include some or all of the components shown in FIG. 7, and may include one or more other components such as any of those shown in FIG. 2 such that the UE 200 may be an example of the UE 700. The processor 750 may include appropriate portions of the processor 210, for example, the general-purpose/application processor 230 and/or the DSP 231. The transceiver 752 may be configured similarly to the transceiver 215 and may include the transceiver interface 214. The processor 750, possibly in conjunction with the memory 754, may be configured to implement one or more PRS operational modes for measuring and possibly processing, at stage 616 shown in FIG. 6, PRS 618 received by the UE 700 in a secondary cell during a dormant time of the secondary cell. For example, the processor 750 comprises a downlink dormant unit 760 that may comprise one or more of a first dormant mode unit 710 configured to implement a first PRS operating mode, and/or a second dormant mode unit 720 configured to implement a second PRS operating mode, and/or a third dormant mode unit 730 configured to implement a third PRS operating mode. The UE 700 may thus be configured to operate in accordance with one or more respective modes to perform one or more respective options, e.g., the UE 700 may be configured to perform a first option, may be configured to perform a second option, may be configured to perform a third option, or any combination thereof (first and third options, second and third options, or first, second, and third options), as discussed herein. The units 710, 720, 730 each comprise the processor 750 and any appropriate portion of the memory 754, e.g., appropriate processor-readable instructions, and possibly stored information received via the transceiver 752, e.g., from the server 400 and/or the TRP 300 (and/or another TRP). The processor 750 may be statically configured with only one of the units 710, 720, 730 possible (e.g., only one of the units 710, 720, 730 being present in the UE 700, or only one of the units 710, 720, 730 enabled, e.g., during manufacture, and being unchangeable) and thus would operate in accordance with the corresponding mode. If the processor 750 is configured with more than one of the units 710, 720, 730 possible, e.g., all three of the units 710, 720, 730, then the processor 750 may be configured to determine which of the units 710, 720, 730 to use, i.e., which PRS operating mode for a dormant secondary cell to implement (e.g., enable). That is, the UE 700 may be configured to implement one or more of the PRS operating modes (even if not enabled) and may be dynamically configured to implement (enable) one of the PRS operating modes. This is indicated by optional stage 615 shown in FIG. 6. For example, the processor 750 may determine to use the first dormant mode unit 710 if no measurement gap is scheduled (i.e., a gap in receipt, and thus measurement, of communication information (i.e., data and/or control information) possibly requested by the UE 700 and scheduled by the server 400 (e.g., as part of RRC signaling from the server 400 to the UE 700) with or without a request for the gap). As another example, if any measurement gap is scheduled for one or more secondary cell(s) (e.g., as requested by the UE 700), then the processor 750 may determine to use the third dormant mode unit 730 for that (those) secondary cell(s), e.g., for the respective measurement gap. Measurement gaps may be different for different secondary cells and may be based on the PRS configuration, e.g., to coincide with receipt of PRS (allowing for better and/or more extensive PRS processing). As another example, the processor 750 may be configured to determine which PRS operating mode to implement based on an instruction received via the transceiver 752, e.g., from the server 400 or from the TRP 300.

The first dormant mode unit 710 is configured to cause the processor 750 not to process any PRS configured (e.g., as indicated in the PRS configuration 612) within a bandwidth of the dormant secondary cell. Thus, in the first PRS operating mode, if any portion of the PRS (e.g., any portion of a PRS resource, any portion of a PRS resource set, or any portion of any PRS resource of a frequency layer) is configured within the bandwidth of the dormant secondary cell, then the processor 750 will not process any of the PRS received during the dormant time of the secondary cell, including any portion of the PRS outside the bandwidth of the dormant secondary cell. That is, if the bandwidth of the PRS is even partially within the dormant secondary cell bandwidth (e.g., spans across component carriers), then at stage 616 the processor 750 may measure, but will process no part of, the PRS received in the secondary cell during the dormant time of the secondary cell. The processor 750 will thus not calculate a range from the UE 700 to the TRP 300, an RSRP (Reference Signal Received Power), a time of arrival (ToA), an angle of arrival (AoA), an RSTD with respect to other TRPs, a SINR (Signal to Interference-plus-Noise Ratio), and/or a receive beam update based on PRS received in the secondary cell during the dormant time of the secondary cell. Thus, this range will not be available for determining a location of the UE 700.

The second dormant mode unit 720 is configured to cause the processor 750 not to process of any portion of PRS configured within the bandwidth of the dormant secondary cell. Thus, in the second PRS operating mode, implemented by the second dormant mode unit 720, at stage 616 the processor 750 will process portions of PRS that are outside the bandwidth of the dormant secondary cell even if these PRS portions are received during the dormant time of the secondary cell, but will not process the frequency-domain subset(s), if any, of the PRS that are within the bandwidth of the dormant secondary cell received while the secondary cell is dormant. The processing of the PRS at stage 616 may include determining a range to a source of the PRS, and may include determining a position of the UE 700 based on the determined range to the source of the PRS.

The third dormant mode unit 730 is configured to cause the processor 750 to process PRS regardless of whether the secondary cell is dormant. Thus, in the third PRS operating mode for a dormant secondary cell, the processor 750 will process the PRS (e.g., calculate range to a source of the PRS) even if some or all of the PRS is within a bandwidth of the dormant secondary cell and received in the secondary cell while the secondary cell is dormant. The processor 750 may be configured to use the third dormant mode unit 730 (i.e., to implement the third operating mode) if a measurement gap is scheduled for when the secondary cell is dormant.

UE SRS For Positioning Operating Modes

The UE 700 may be configured to transmit SRS 622 (see FIG. 6) for positioning under one or more of various conditions. While the description herein refers to SRS for positioning, this term is not limited to any particular form of uplink signal for positioning. A fourth dormant mode unit 740 of the UE 700 may be configured to cause the UE 700 to send SRS for positioning based on the UE 700 processing, or being configured (e.g., expected) to process PRS. This may help improve efficient use of power such that if power is used to process PRS, then the UE 700 will also send SRS for positioning, e.g., to facilitate RTT, e.g., multi-RTT positioning. This may help avoid wasting power by processing the PRS but not sending the SRS for positioning. The fourth dormant mode unit 740 comprises the processor 750 and any appropriate portion of the memory 754, e.g., appropriate processor-readable instructions, and possibly stored information received via the transceiver 752, e.g., from the server 400 and/or from the TRP 300 (and/or another TRP). The fourth dormant mode unit 740 may be configured to cause the UE 700 to transmit SRS for positioning if the UE 700 processes DL PRS, e.g., in accordance with the second PRS operating mode or the third PRS operating mode. The fourth dormant mode unit 740 may be configured to cause the UE 700 to inhibit (e.g., prevent) transmission of SRS for positioning if the UE 700 does not process DL PRS, e.g., in accordance with the first PRS operating mode. The UE 700 may thus not transmit SRS for positioning based on the UE 700 not processing any DL PRS but to transmit SRS for positioning if any DL PRS is processed. The fourth dormant mode unit 740 may be configured to cause the UE 700 to transmit SRS for positioning similarly to how the UE 700 is configured to transmit any other SRS based on the UE 700 being configured to transmit SRS for positioning in the absence of DL PRS being configured. Also or alternatively, the fourth dormant mode unit 740 may be configured to determine whether to transmit SRS for positioning based on an SRS instruction 620 received from the primary cell, e.g., from the TRP 300 using the primary component carrier 602, and/or an SRS instruction 621 received from the server 400. For example, the SRS instruction 620 and/or the SRS instruction 621 may instruct the UE 700 as to which mode of SRS processing, discussed above, to implement.

The UE 700 may send a positioning information indication 624 to the server 400 (e.g., directly, as shown, or via the TRP 300). The positioning information may include a position estimate (also called a position) of the UE 700. The UE 700, e.g., the processor 750, may determine the position of the UE 700 based on the PRS and possibly the SRS (e.g., for RTT position determination). Also or alternatively, the positioning information may include information from which the position of the UE 700 may be determined. For example, the UE 700 may send one or more positioning signal measurements and/or information derived from one or more positioning signal measurements, e.g., a range from the UE 700 to the source(s) of the positioning signal(s).

Operation

Figure 8:
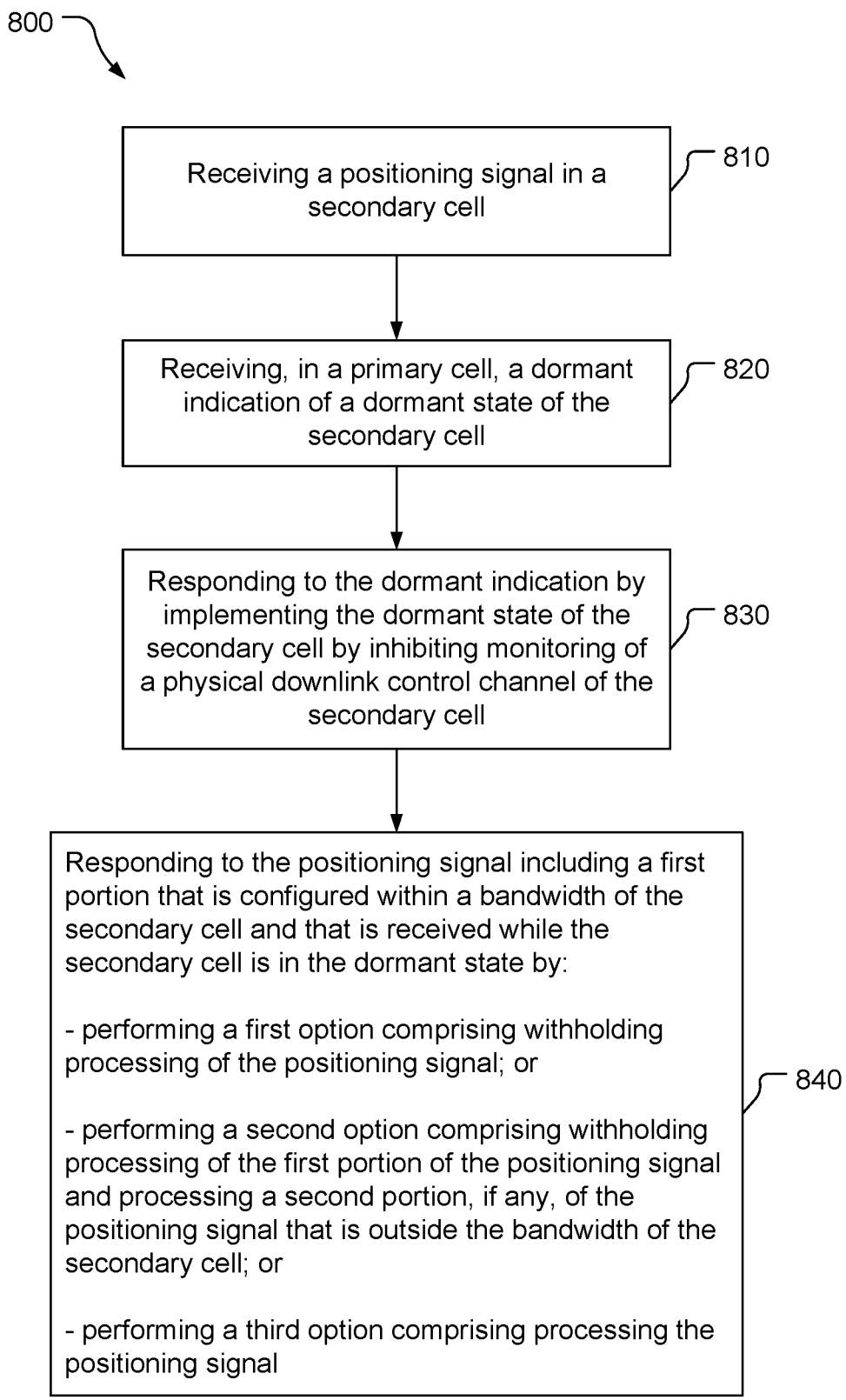
FIG. 8 is a block flow diagram of a method of implementing a dormant state of a secondary cell by a user equipment.

Referring to FIG. 8, with further reference to FIGS. 1-7, a method 800 of implementing a dormant state of a secondary cell includes the stages shown. The method 800 is, however, an example only and not limiting. The method 800 may be altered, e.g., by having stages added, removed, rearranged, combined, performed concurrently, and/or having single stages split into multiple stages.

At stage 810, the method 800 includes receiving a positioning signal in the secondary cell at the UE. For example, the UE 700 may receive the PRS 618, e.g., one or more PRS resources, one or more PRS resource sets, PRS resources of one or more frequency layers, another positioning reference signal that can be used for positioning measurement, etc., from the TRP 300 in a bandwidth of the secondary cell, e.g., using the secondary component carrier 604. The other positioning reference signal may be, for example, a Synchronization Signal Block (SSB), a Tracking Reference Signal (TRS), a CSI-RS, a DM-RS (Demodulation Reference Signal) of PDSCH (Physical Downlink Shared CHannel), or a DM-RS of PDCCH. The processor 750, possibly in combination with the memory 754, and the transceiver 752 (e.g., the wireless receiver 244 and the antenna 246) may comprise means for receiving the positioning signal.

At stage 820, the method 800 includes receiving, in a primary cell at the UE, a dormant indication of a dormant state of the secondary cell. For example, the UE 700 receives the dormant configuration 610, from the TRP 300 in a bandwidth of the primary cell, e.g., using the primary component carrier 602, indicating for the secondary cell, e.g., the secondary component carrier 604 of the TRP 300, to be dormant (at the UE 700). The processor 750, possibly in combination with the memory 754, and the transceiver 752 (e.g., the wireless receiver 244 and the antenna 246) may comprise means for receiving the dormant indication.

At stage 830, the method 800 includes responding to the dormant indication by implementing the dormant state of the secondary cell by inhibiting monitoring of a physical downlink control channel of the secondary cell by the UE. For example, for inhibiting monitoring of a physical downlink control channel, the UE 700 stops monitoring the physical downlink control channel of the secondary component carrier 604 from the TRP 300. The processor 750, possibly in combination with the memory 754 may comprise means for responding to the dormant indication by implementing the dormant state of the secondary cell by inhibiting monitoring of the physical downlink control channel of the secondary cell by the UE.

At stage 840, the method 800 includes responding to the positioning signal including a first portion that is configured within a bandwidth of the secondary cell by: performing a first option comprising withholding processing of the positioning signal; or performing a second option comprising withholding processing of the first portion of the positioning signal and processing a second portion, if any, of the positioning signal that is configured outside the bandwidth of the secondary cell; or performing a third option comprising processing the positioning signal. To implement the first option, the UE 700 may not process (e.g., determine range to source from) any of a PRS (e.g., PRS resource, PRS resource set, PRS resources in a frequency layer) if any portion of the PRS is received while the secondary cell is in the dormant state and is in the bandwidth of the secondary cell. To implement the second option, the UE 700 may not process a portion of a PRS that is received while the secondary cell is in the dormant state and that is configured within the bandwidth of the secondary cell, but may process other portions of the PRS (e.g., not in the bandwidth of the secondary cell). To implement the third option, the UE 700 may process all PRS received during the dormant state of the secondary cell. The UE 700 could be statically configured to implement only one of the options or could be dynamically configured to implement one of the options, e.g., statically configured to implement multiple options and able to implement one of the options at one time, and another one of the options at another time. The processor 750, possibly in combination with the memory 754 may comprise means for responding to the positioning signal including the first portion that is configured within the bandwidth of the secondary cell and that is received while the secondary cell is in the dormant state by performing the first option, or the second option, or the third option. These means may be configured to perform only one of these options, or may be configured to perform more than one of these options and to select which option to perform.

Implementations of the method 800 may include one or more of the following features. In an example implementation, the method 800 may include determining whether to perform the first option or the third option based on whether a measurement gap is scheduled. For example, the UE 700 may determine to implement the first option in the absence of a scheduled measurement gap, and to implement the third option if a measurement gap is scheduled (based on presence (existence) of the scheduled measurement gap). The processor 750, possibly in combination with the memory 754 may comprise means for determining which option to perform, e.g., whether to perform the first option or the third option. In another example implementation, the method 800 may include selecting to perform one of the options based on an instruction received (e.g., from a network entity such as the TRP 300 or the server 400) via a transceiver of the UE. For example, the UE 700 may be configured to perform any of the options and may select one of the options in response to an instruction from the server 400 or the TRP 300, e.g., in the primary cell, indicating which option to perform. The processor 750, possibly in combination with the memory 754 and/or the transceiver 752 (e.g., the wireless receiver 244) and the antenna 246 may comprise means for selecting the option to perform.

Also or alternatively, implementations of the method 800 may include one or more of the following features. In an example implementation, the method 800 may include transmitting an SRS for positioning (e.g., an uplink positioning signal, a sidelink positioning signal, and/or a downlink positioning signal) within the bandwidth of the secondary cell based on processing of the positioning signal in accordance with the second option or the third option. For example, the UE 700 may transmit an SRS for positioning if the UE 700 processes any portion of a PRS where the PRS is received in the secondary cell while the secondary cell is in the dormant state (e.g., in response to performing the second option or the third option). In another example implementation, the method 800 may include preventing transmission of an SRS for positioning within the bandwidth of the secondary cell absent processing of the positioning signal in accordance with the second option or the third option. For example, the UE 700 may not transmit an SRS for positioning if the UE 700 implements the first option and thus does not process any of the positioning signal in response to any of the positioning signal being within the bandwidth of the secondary cell and received while the secondary cell is in the dormant state. In another example implementation, the method 800 may include, in response to receiving a configuration indication, transmitting an SRS for positioning within the bandwidth of the secondary cell similarly to how a processor of the UE is configured to transmit other SRS based on the configuration indication lacking one or more parameters needed to configure the processor to receive downlink positioning reference signals within the bandwidth of the secondary cell. For example, the processor 750 may send SRS for positioning in the same manner as other SRS if the UE is not configured to receive (and thus measure) downlink positioning reference signals (e.g., in the secondary cell), e.g., the UE is configured for SRS transmission without being configured for PRS reception and/or measurement). In another example implementation, the method 800 may include determining whether to transmit an SRS for positioning within the bandwidth of the secondary cell, with the secondary cell being in the dormant state, based on a configuration indication received via a transceiver of the UE. For example, the processor 750 may determine whether to transmit SRS for positioning based on an instruction from a network entity, e.g., the SRS instruction 620 from the TRP 300, e.g., in the primary cell, and/or based on the SRS instruction 621 from the server 400. The processor 750, possibly in combination with the memory 754 and/or the transceiver 752 (e.g., the wireless transmitter 242 and/or the wireless receiver 244 and the antenna 246) may comprise means for transmitting the SRS for positioning, means for preventing transmission of SRS for positioning, and/or means for determining whether to transmit SRS for positioning.

Also or alternatively, implementations of the method 800 may include one or more of the following features. In an example implementation, the method 800 may include sending an indication from the UE and/or a serving base station (e.g., the TRP 300) to a network entity indicating that a particular secondary cell is in the dormant state, or that the particular secondary cell may be dynamically configured to be in the dormant state, or that a configured positioning signal is within a bandwidth of the particular secondary cell and the particular secondary cell is in the dormant state, or that the configured positioning signal is within the bandwidth of the particular secondary cell and the particular secondary cell may be dynamically configured to be in the dormant state. Also or alternatively, the TRP 300 may send such an indication to the server 400. Thus, the UE 700 and/or the TRP 300 may inform the server 400 that position information based on the secondary cell may not be reliable or may not be forthcoming. The server 400 may respond to such information as appropriate, e.g., by discounting or ignoring position information based on the secondary cell and/or reconfiguring a PRS schedule.

Figure 9:
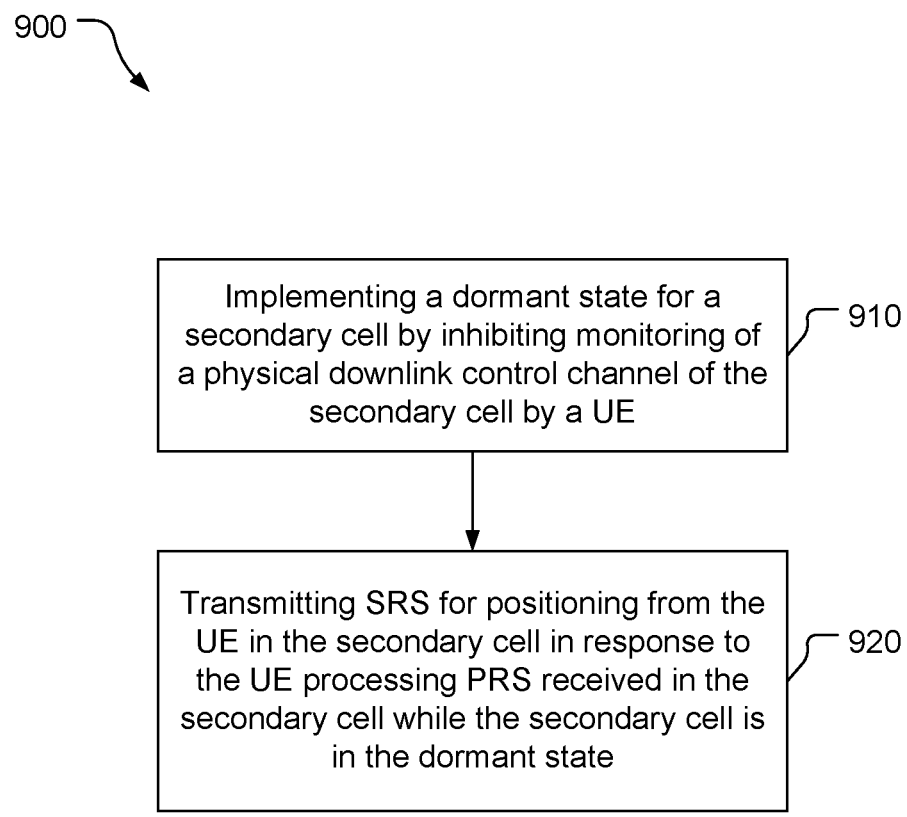
FIG. 9 is a block flow diagram of a method of transmitting an uplink reference signal for positioning from a user equipment.

Referring to FIG. 9, with further reference to FIGS. 1-8, a method 900 of transmitting an SRS for positioning from a UE includes the stages shown. The method 900 is, however, an example only and not limiting. The method 900 may be altered, e.g., by having stages added, removed, rearranged, combined, performed concurrently, and/or having single stages split into multiple stages.

At stage 910, the method may include implementing a dormant state for a secondary cell by inhibiting monitoring of a physical downlink control channel of the secondary cell by the UE. For example, the UE 700 stops monitoring the physical downlink control channel of the secondary component carrier 604 from the TRP 300. The processor 750, possibly in combination with the memory 754 may comprise means for implementing the dormant state.

At stage 920, the method 900 may include transmitting the SRS for positioning from the UE in the secondary cell in response to the UE processing a PRS received in the secondary cell while the secondary cell is in the dormant state. For example, the processor 750 (possibly using the memory 754) may transmit the SRS for positioning via the transceiver 752 and the antenna 246 if a PRS is received in a dormant secondary cell. The processor 750, possibly in combination with the memory 754, the transceiver 752 (e.g., the wireless transmitter 242), and the antenna 246 may comprise means for transmitting the SRS for positioning. The processor 750, possibly in combination with the memory 754, the transceiver 752 (e.g., the wireless receiver 244), and the antenna 246 may comprise means for receiving the PRS (e.g., from a network entity such as the TRP 300 and/or the server 400) and the processor 750, possibly in combination with the memory 754, may comprise means for processing the PRS.

Implementations of the method 900 may include one or more of the following features. In an example implementation, the method 900 may include withholding transmitting the SRS for positioning absent the UE processing the PRS received in the secondary cell while the secondary cell is in the dormant state. For example, the processor 750 may only transmit the SRS in the secondary cell if the PRS is received in the dormant secondary cell and processed, and thus withhold transmitting the SRS for positioning if no PRS, that is received in the secondary cell while the secondary cell is dormant, is processed. The processor 750, possibly in combination with the memory 754, may comprise means for withholding transmitting the SRS for positioning. In another example implementation, transmitting the SRS for positioning may comprise transmitting, absent the UE receiving a PRS configuration indication, the SRS for positioning in the secondary cell similarly to how other SRS are transmitted. Absent the UE receiving a PRS configuration indication, the UE may not measure DL PRS. In another example implementation, transmitting the SRS for positioning may comprise transmitting the SRS for positioning based on an SRS transmission indication received by the UE from a network entity. For example, the processor 750 may transmit the SRS for positioning based on the SRS instruction 620 received from the TRP 300 and/or the SRS instruction 621 received from the server 400.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims. Components, functional or otherwise, shown in the figures and/or discussed herein as being connected or communicating with each other are communicatively coupled unless otherwise noted. That is, they may be directly or indirectly connected to enable communication between them.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment (UE) comprising:
a transceiver configured to receive a positioning signal;
a memory; and
a processor, communicatively coupled to the transceiver and the memory, configured to:
  receive, via the transceiver in a primary cell, a dormant indication of a dormant state of a secondary cell; and
  respond to receiving the dormant indication by implementing the dormant state of the secondary cell by inhibiting monitoring of a physical downlink control channel of the secondary cell by the processor;
wherein the processor is configured to operate in accordance with a first option, or configured to operate in accordance with a second option, or configured to operate in accordance with a third option, or any combination thereof;
wherein the processor is configured to respond to the positioning signal including a first portion that is configured within a bandwidth of the secondary cell and that is received while the secondary cell is in the dormant state by:
  withholding, in accordance with the first option, processing of the positioning signal; or
  withholding, in accordance with the second option, processing of the first portion of the positioning signal and processing a second portion, if any, of the positioning signal that is configured outside the bandwidth of the secondary cell; or
  processing, in accordance with the third option, the positioning signal; and
wherein the processor is further configured to prevent transmission of a sounding reference signal (SRS) for positioning within the bandwidth of the secondary cell absent the processor processing the positioning signal in accordance with the second option or the third option.

2. The UE of claim 1, wherein the processor is configured to operate in accordance with the first option and the third option and is further configured to select either the first option or the third option based on whether a measurement gap is scheduled.

3. The UE of claim 2, wherein the processor is configured to select the first option based on an absence of a scheduled measurement gap and to select the third option based on a presence of the scheduled measurement gap.

4. The UE of claim 1, wherein the positioning signal comprises one or more positioning reference signal (PRS) resources, or one or more PRS resource sets, or all PRS resources of one or more frequency layers, or another positioning reference signal that can be used for positioning measurement.

5. The UE of claim 1, wherein the processor is configured to operate in accordance with at least two of the first option, the second option, and the third option, and is further configured to select which option in accordance with which to operate based on an instruction received via the transceiver.

6. The UE of claim 1, wherein the processor is further configured to transmit a sounding reference signal (SRS) for positioning within the bandwidth of the secondary cell in response to the processor processing the positioning signal according to the second option or the third option.

7. The UE of claim 1, wherein the processor is further configured to respond to receiving a configuration indication by selecting a mode of the processor in which the processor is configured to transmit a sounding reference signal (SRS) for positioning within the bandwidth of the secondary cell similarly to how the processor is configured to transmit other SRS, based on the configuration indication lacking one or more parameters needed to configure the processor to receive downlink positioning reference signals within the bandwidth of the secondary cell.

8. The UE of claim 1, wherein the processor is further configured to determine whether to transmit a sounding reference signal (SRS) for positioning within the bandwidth of the secondary cell, with the secondary cell being in the dormant state, based on a configuration indication received via the transceiver.

9. The UE of claim 1, wherein the processor is further configured to send, via the transceiver, an indication to a network entity indicating at least one of:
  that a particular secondary cell is in the dormant state; or
  that the particular secondary cell may be dynamically configured to be in the dormant state; or
  that a configured positioning signal is within a bandwidth of the particular secondary cell and the particular secondary cell is in the dormant state; or that the configured positioning signal is within the bandwidth of the particular secondary cell and the particular secondary cell may be dynamically configured to be in the dormant state.

10. A method of implementing a dormant state of a secondary cell, the method comprising:
receiving a positioning signal in the secondary cell at a UE (user equipment);
receiving, in a primary cell at the UE, a dormant indication of the dormant state of the secondary cell;
responding to receiving the dormant indication by implementing the dormant state of the secondary cell by inhibiting monitoring of a physical downlink control channel of the secondary cell by the UE;
responding to the positioning signal including a first portion that is configured within a bandwidth of the secondary cell and that is received while the secondary cell is in the dormant state by:
performing a first option comprising withholding processing of the positioning signal; or
performing a second option comprising withholding processing of the first portion of the positioning signal and processing a second portion, if any, of the positioning signal that is configured outside the bandwidth of the secondary cell; or
performing a third option comprising processing the positioning signal; and
preventing transmission of a sounding reference signal (SRS) for positioning within the bandwidth of the secondary cell absent processing of the positioning signal in accordance with the second option or the third option.

11. The method of claim 10, further comprising determining whether to perform the first option or the third option based on whether a measurement gap is scheduled.

12. The method of claim 11, further comprising:
determining to perform the first option based on an absence of a scheduled measurement gap; or
determining to perform the third option based on a presence of the scheduled measurement gap.

13. The method of claim 10, wherein the positioning signal comprises one or more positioning reference signal (PRS) resources, or one or more PRS resource sets, or all PRS resources of one or more frequency layers, or another positioning reference signal that can be used for positioning measurement.

14. The method of claim 10, wherein implementing the dormant state comprises selecting to perform the first option, or the second option, or the third option based on an instruction received via a transceiver of the UE.

15. The method of claim 10, further comprising transmitting a sounding reference signal (SRS) for positioning within the bandwidth of the secondary cell based on processing of the positioning signal according to the second option or the third option.

16. The method of claim 10, further comprising, in response to receiving a configuration indication, transmitting a sounding reference signal (SRS) for positioning within the bandwidth of the secondary cell similarly to how a processor of the UE is configured to transmit other SRS based on the configuration indication lacking one or more parameters needed to configure the processor to receive downlink positioning reference signals within the bandwidth of the secondary cell.

17. The method of claim 10, further comprising determining whether to transmit a sounding reference signal (SRS) for positioning within the bandwidth of the secondary cell, with the secondary cell being in the dormant state, based on a configuration indication received via a transceiver of the UE.

18. The method of claim 10, further comprising sending an indication, from at least one of the UE or a serving base station, to a network entity indicating at least one of:
that a particular secondary cell is in the dormant state; or
that the particular secondary cell may be dynamically configured to be in the dormant state; or
that a configured positioning signal is within a bandwidth of the particular secondary cell and the particular secondary cell is in the dormant state; or
that the configured positioning signal is within the bandwidth of the particular secondary cell and the particular secondary cell may be dynamically configured to be in the dormant state.

19. A user equipment (UE) comprising:
means for receiving a positioning signal in a secondary cell;
means for receiving, in a primary cell, a dormant indication of a dormant state of the secondary cell;
means for responding to receiving the dormant indication by implementing the dormant state of the secondary cell by inhibiting monitoring of a physical downlink control channel of the secondary cell by the UE;
means for operating the UE comprising means for performing a first option, or means for performing a second option, or means for performing a third option, or any combination thereof;
means for responding to the positioning signal including a first portion that is configured within a bandwidth of the secondary cell and that is received while the secondary cell is in the dormant state by having the means for operating the UE:
perform the first option by withholding processing of the positioning signal; or
perform the second option by withholding processing of the first portion of the positioning signal and processing a second portion, if any, of the positioning signal that is configured outside the bandwidth of the secondary cell; or
perform the third option by processing the positioning signal; and
means for preventing transmission of a sounding reference signal (SRS) for positioning within the bandwidth of the secondary cell absent processing of the positioning signal in accordance with the second option or the third option.

20. The UE of claim 19, wherein the means for operating the UE comprise the means for performing the first option and the means for performing the third option, and wherein the UE further comprises means for determining whether to perform the first option or the third option based on whether a measurement gap is scheduled.

21. The UE of claim 19, further comprising means for transmitting a sounding reference signal (SRS) for positioning within the bandwidth of the secondary cell based on the means for operating the UE processing the positioning signal according to the second option or the third option.

22. A non-transitory, processor-readable storage medium comprising processor-readable instructions configured to cause a processor of a user equipment (UE) to:
respond to receiving, in a primary cell, a dormant indication of a dormant state of a secondary cell by implementing the dormant state of the secondary cell by inhibiting monitoring of a physical downlink control channel of the secondary cell by the processor;

perform a first option, or perform a second option, or perform a third option, or any combination thereof;

respond to receiving, in the secondary cell, a positioning signal including a first portion that is configured within a bandwidth of the secondary cell and that is received while the secondary cell is in the dormant state by:

performing the first option by withholding processing by the processor of the positioning signal; or performing the second option by withholding processing of the first portion of the positioning signal and processing a second portion, if any, of the positioning signal that is configured outside the bandwidth of the secondary cell; or performing the third option by processing the positioning signal; and preventing transmission of a sounding reference signal (SRS) for positioning within the bandwidth of the secondary cell absent processing of the positioning signal in accordance with the second option or the third option.

23. A user equipment (UE) comprising:

a transceiver configured to receive a Positioning Reference Signal (PRS);

a memory; and a processor, communicatively coupled to the transceiver and the memory, configured to:

implement a dormant state for a secondary cell by inhibiting monitoring of a physical downlink control channel of the secondary cell by the processor;

transmit a Sounding Reference Signal (SRS) for positioning via the transceiver in the secondary cell in response to the processor processing the PRS received in the secondary cell while the secondary cell is in the dormant state; and withhold transmitting the SRS for positioning absent the processor processing the PRS received in the secondary cell while the secondary cell is in the dormant state.

24. The UE of claim 23, wherein the processor is configured to transmit the SRS for positioning in the secondary cell similarly to how the processor is configured to transmit other SRS based on absence of the processor receiving a PRS configuration via the transceiver.

25. The UE of claim 23, wherein the processor is further configured to determine whether to transmit the SRS for positioning in the secondary cell based on an SRS transmission indication received via the transceiver from a network entity.

26. A method of transmitting a Sounding Reference Signal (SRS) for positioning from a user equipment (UE), the method comprising:

implementing a dormant state for a secondary cell by inhibiting monitoring of a physical downlink control channel of the secondary cell by the UE;

transmitting the SRS for positioning from the UE in the secondary cell in response to the UE processing a Positioning Reference Signal (PRS) received in the secondary cell while the secondary cell is in the dormant state; and withholding transmitting the SRS for positioning absent the UE processing the PRS received in the secondary cell while the secondary cell is in the dormant state.

27. The method of claim 26, wherein transmitting the SRS for positioning comprises transmitting, absent the UE receiving a PRS configuration, the SRS for positioning in the secondary cell similarly to how other SRS are transmitted.

28. The method of claim 26, wherein transmitting the SRS for positioning comprises transmitting the SRS for positioning based on an SRS transmission indication received by the UE from a network entity.

29. A user equipment (UE) comprising:

means for receiving a Positioning Reference Signal (PRS);

means for implementing a dormant state for a secondary cell by inhibiting monitoring of a physical downlink control channel of the secondary cell by the UE;

means for processing the PRS;

means for transmitting the SRS for positioning from the UE in the secondary cell in response to the means for processing the PRS processing the PRS received in the secondary cell while the secondary cell is in the dormant state; and means for withholding transmitting the SRS for positioning absent the UE processing the PRS received in the secondary cell while the secondary cell is in the dormant state.

30. A non-transitory, processor-readable storage medium comprising processor-readable instructions to cause a processor of a user equipment (UE) to:

receive a Positioning Reference Signal (PRS);

implement a dormant state for a secondary cell by inhibiting monitoring of a physical downlink control channel of the secondary cell by the processor;

transmit the SRS for positioning from the UE in the secondary cell in response to the processor-readable instructions causing the processor to process the PRS received in the secondary cell while the secondary cell is in the dormant state; and withhold transmitting the SRS for positioning absent the UE processing the PRS received in the secondary cell while the secondary cell is in the dormant state.

* * * * *